United States Patent
Balbir et al.

(10) Patent No.: US 8,777,555 B1
(45) Date of Patent: Jul. 15, 2014

(54) YAW DRIVE TIDAL TURBINE SYSTEM AND METHOD

(71) Applicant: Lockheed Martin Corporation, Bethesda, MD (US)

(72) Inventors: Benjamin Balbir, Reisterstown, MD (US); Richard J. Handwerg, Loxahatchee, FL (US); Tejbir Arora, Bel Air, MD (US); Richard P. Clark, Jupiter, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 36 days.

(21) Appl. No.: 13/773,459

(22) Filed: Feb. 21, 2013

(51) Int. Cl.
*F03B 13/12* (2006.01)
*F03B 13/26* (2006.01)

(52) U.S. Cl.
CPC .................................... *F03B 13/264* (2013.01)
USPC ............................................. 415/3.1; 290/53

(58) Field of Classification Search
CPC ....................................................... F03B 13/12
USPC ............................................ 290/54; 415/3.1
See application file for complete search history.

(56) References Cited

U.S. PATENT DOCUMENTS

| | | | | |
|---|---|---|---|---|
| 6,104,097 A * | 8/2000 | Lehoczky | ....................... | 290/54 |
| 6,956,300 B2 | 10/2005 | Gizara | | |
| 7,291,936 B1 | 11/2007 | Robson | | |
| 7,795,750 B2 | 9/2010 | Perner et al. | | |
| 8,102,071 B2 | 1/2012 | Catlin | | |
| 8,303,241 B2 * | 11/2012 | Corren et al. | ................... | 415/3.1 |
| 8,459,945 B2 * | 6/2013 | Huxley-Reynard et al. | ...... | 416/9 |
| 8,601,805 B2 * | 12/2013 | Kameda et al. | .................. | 60/398 |
| 8,674,535 B2 * | 3/2014 | Arlitt et al. | ....................... | 290/43 |
| 2007/0041823 A1 * | 2/2007 | Miller | ............................. | 415/4.1 |
| 2007/0207028 A1 | 9/2007 | Nicholas et al. | | |
| 2009/0302611 A1 | 12/2009 | Masters et al. | | |
| 2010/0129221 A1 | 5/2010 | Huxley-Reynard et al. | | |
| 2011/0095530 A1 | 4/2011 | Blumer et al. | | |
| 2014/0037449 A1 * | 2/2014 | Perner et al. | ...................... | 416/1 |

FOREIGN PATENT DOCUMENTS

| | | | |
|---|---|---|---|
| GB | 2431207 A | * | 4/2007 |
| WO | WO 2009064430 A1 | * | 5/2009 |
| WO | 2010015359 A1 | | 2/2010 |
| WO | 2010078903 A2 | | 7/2010 |
| WO | 2010078903 A3 | | 7/2010 |
| WO | 2011107799 A2 | | 9/2011 |
| WO | 2011107799 A3 | | 9/2011 |
| WO | 2012098362 A1 | | 7/2012 |

OTHER PUBLICATIONS

Saeterstad, "Dimensioning Loads for a Tidal Turbine," Norwegian University of Science and Technology (Jun. 2011), 144 pp.

(Continued)

*Primary Examiner* — Joseph Waks
(74) *Attorney, Agent, or Firm* — Billion & Armitage; Richard E. Billion

(57) ABSTRACT

A tidal turbine system includes yaw drive for rotating the turbine between a first position associated with tidal flow and a second position associated with tidal ebbs. The yaw drive is capable of moving the tidal turbine to a position where the tidal turbine is pointed substantially directly into the tidal flow in the first position and substantially into the tidal ebb in a second position. A method for harvesting tidal energy includes rotating the tidal turbine between one of the first position and the second position.

14 Claims, 9 Drawing Sheets

(56) References Cited

OTHER PUBLICATIONS

Divett et al., "Maximising Energy Capture by Fixed Orientation Tidal Stream Turbines in Time-Varying Off Axis Current," Proceedings of the Australasian Coasts and Ports Conference 16-18 (Sep. 2009) Wellington, New Zealand, 6 pp.

Weilepp, "Simple and Robust Solutions for Tidal Current Power Generation," Ship & Port (2009) No. 3, 3 pp.

Francis et al., "SRTT Floating Tidal Turbine Production Design Study with Independent Verification," Scotrenewables Ltd. (Oct. 2007), 83 pp.

\* cited by examiner

US 8,777,555 B1

YAW DRIVE TIDAL TURBINE SYSTEM AND METHOD

TECHNICAL FIELD

Various embodiments described herein relate to a yaw drive system and method. The yaw drive system and method is used to improve the efficiency of harvesting energy from the tides in the ocean.

BACKGROUND

There are many locations around the globe that have active, high velocity tidal flows. These high velocity flow areas present a great potential to convert the changing tides or tidal energy into electrical energy. Tidal turbines having large blades are placed on the ocean floor or otherwise positioned in the locations with high velocity tidal flows. The tide imparts motion on the blades of these tidal turbines which, in turn, drives a generator to produce electricity. The electricity produced is transmitted to a land-based sub-station for distribution on land. This type of electrical energy is desirable as there are many populated areas near the oceans of the world and furthermore since this source of energy is more or less invisible, beautiful ocean scenery is relatively untouched by the use of tidal turbines.

Tidal energy is to a great extent predictable. The deterministic nature of the availability of power, together with its high density and the implicit absence of visual and very minimal navigational impact makes tidal energy extraction a very attractive financial proposition particularly since virtually the whole of the available resources remain untapped.

Generally changes in current flow are due to the naturally occurring phases of the moon and sun. Tidal flows are inherently oscillatory (two directional ebb & flow). However, the ebb and flow tides are not always anti-parallel. In other words, the ebb may not be exactly 180 degrees away from the flow. In addition, the angle between ebb and flow tides can be highly spatially variable within a field. Natural structures within a tidal field may also affect the angle between the ebb and flow tides in a particular area. In addition, tidal flows change directions seasonally by 5-10 degrees. In some locations, the seasonal changes can even be more pronounced. Once local anomalies and the seasons are accounted for, the directions remain relatively predictable. Superimposed on the pattern of ebbs and flows are variations from other sources, such as intense atmospheric events Current tidal turbines have shortcomings. Many fail to account for differences in the angle between the ebb and flow of the tide and, in this way, energy is lost because there will be a component of tidal energy in either the ebb or flow or both that will be lost. One type of turbine includes a bi-directional rotor, using symmetrical blades that operate in both ebb and flood tides. Another type of turbine include two mono-directional rotors. In these previous undersea turbines, the divergence from anti-parallel flows between the ebb and the flow is not accounted for. These systems are able to capture energy from the ebb and flow, but they are not as efficient since some of the flows do not flow directly into the turbines.

The two rotor turbine is much more expensive in that two large rotors are used; the drive train must be specifically configured to support two-directional power generation. This adds to the complexity and lowers the reliability of the turbine. In the one bi-directional turbine, the stanchion and the lack of accounting for the anti-parallel flow results in approximately a 25% extraction penalty in many environments. This type of arrangement is also less reliable. In both the ebb and flow, the flow of the tides is substantially reduced behind the stanchion. In one direction, the blade of the turbine passes through this low flow area. Each blade goes from being loaded to unloaded and then back to loaded as it passes through the area behind the stanchion. This results in fatigue stress on the blades shortens the effective life of the turbine blades. In another type of turbine, the pitch of the blades is varied like in a wind turbine. Varying the pitch also fails to account for anti-parallel ebbs and flows. If the variable pitch blades must pass in the wake of the stanchion these blades are also subject to fatigue stress. Furthermore, active movements of the blades during high flow speed times in a heavy fluid presents reliability challenges. Most of the placements of tidal turbines do not account for the non anti-parallel nature of the ebbs and flows so a component portion of the ebb or the flow or both is lost in terms of energy extraction. In other words, since the turbine is not pointed directly into the ebb or the flow or both, a portion of the potential energy that could be extracted is lost.

There is a need for an improved system capable of extracting more energy from the natural resource. In addition, there is also a need for a less expensive system and method.

DETAILED DESCRIPTION

Figure 1:
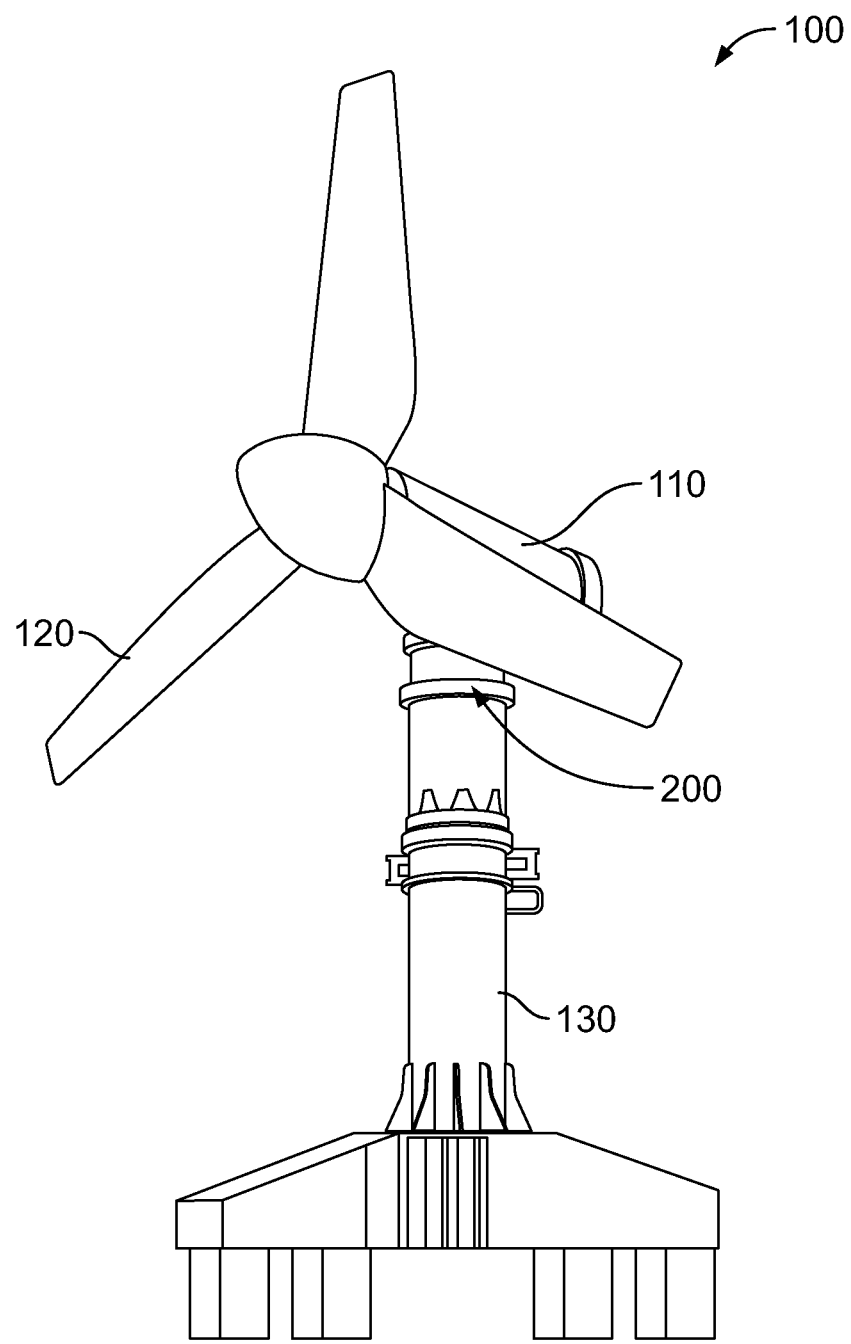
FIG. 1 is a perspective view of a tidal turbine having a yaw drive, according to an example embodiment.

FIG. 1 is a perspective view of a tidal turbine 100 having a yaw drive 200, according to an example embodiment. The tidal turbine 100 includes a generator 110. Attached is a generator is a first blade 120 and a second blade 122. Tidal currents turn the blades 120, 122 which in turn rotates the rotor with respect to the stator in the generator 110 to produce electricity from the tidal currents. Electricity produces transmitted from the tidal turbine 100 to a land-based power station for distribution. Attached to the tidal turbine 100 is a yaw drive 200. The yaw drive 200 is sized and designed to rotate the tidal turbine 100 into either an ebb or a flow of the tides. The drive is also attached to a stanchion 130, as shown in FIG. 1. The stanchion 130 is attached to the ocean floor and holds the tidal turbine 100 off the ocean floor. The tidal turbine 100 is positioned within an area of active tides. The yaw drive 200 includes a slip ring for transmitting power from the tidal turbine 100. The tidal turbine 100 is also sealed so that it can withstand the undersea environment.

Figure 2:
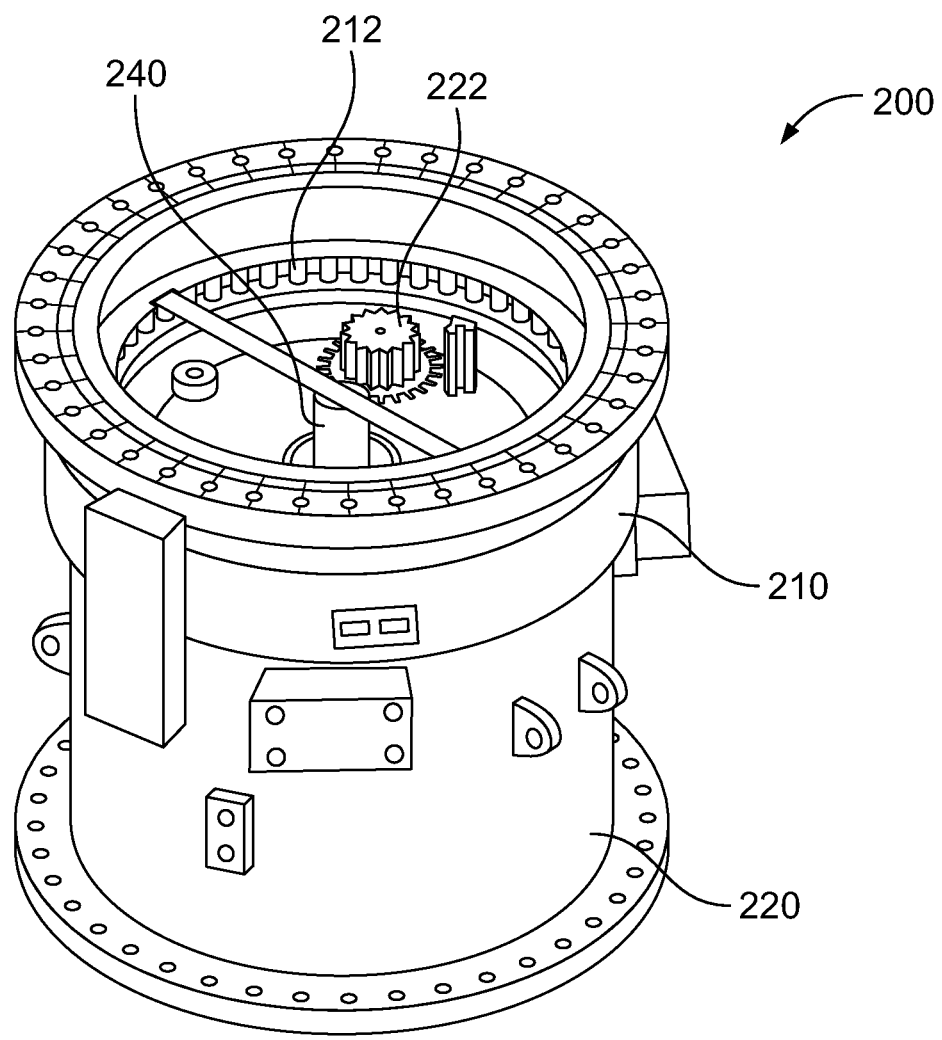
FIG. 2 is a perspective view of yaw drive detached from the tidal turbine 100, according to an example embodiment.

FIG. 2 is a perspective view of yaw drive 200 detached from the tidal turbine 100, according to an example embodiment. The yaw drive 200 includes an upper shell 210 and a lower shell 220. The lower shell 220 is stationary or fixed. The upper shell 210 rotates with respect to the lower shell 220. Attached to the upper shell 210 is a ring drive or slew gear 212. The lower shell 220 includes at least one pinion gear 222 that engages the ring drive or slew gear 212. The pinion gear 222 is attached to a drive shaft of a drive motor. The drive motor is fixedly attached to the lower shell 220. The drive 200 also includes a slip ring 240. The slip ring allows electricity or power to be transmitted through a rotating joint. The yaw drive 200 will be further detailed in the following paragraphs and through the discussion of FIGS. 3-5.

Figure 3:
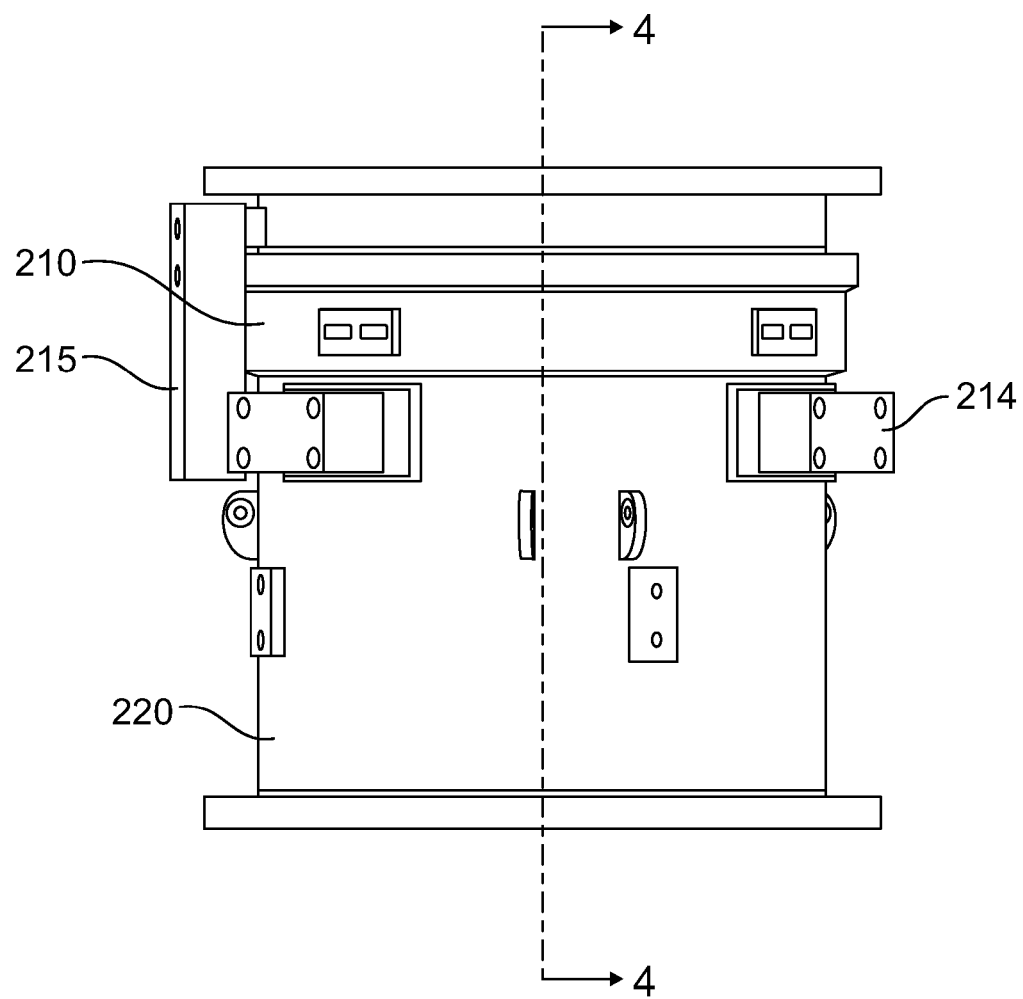
FIG. 3 is a side view of a yaw drive, according to an example embodiment.

FIG. 3 is a side view of a yaw drive 200, according to an example embodiment. The drive includes the lower shell 220 and the upper shell 210. As mentioned above the lower shell 220 is fixed, and the upper shell 210 rotates with respect to the lower shell. The lower shell 220 includes a stop bumper 214 and a stop striker 215. The stop bumper 214 and the stop striker 215 limit the rotational motion of the upper shell 210 with respect to the lower shell 220.

Figure 4:
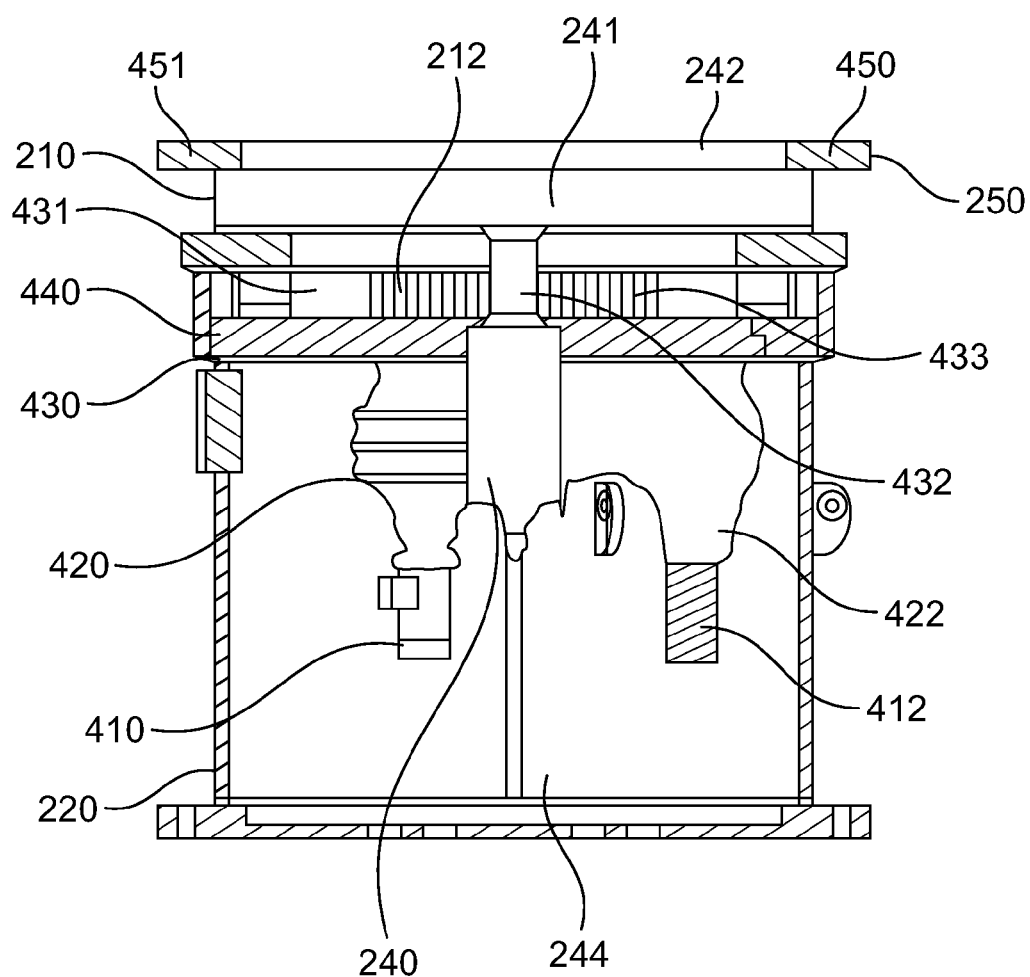
FIG. 4 is a cut away view of a yaw drive along line 4-4 from FIG. 3, according to an example embodiment.

FIG. 4 is a cut away view of a yaw drive 200 along line 4-4 from FIG. 3, according to an example embodiment. Within the lower shell 220 are plurality of electric motors 410, 412 which are attached to gearboxes 420, 422 respectively. The gearboxes 420, 422 include a drive shaft 430, 432 onto which pinion gears 431, 433 are attached. Two electric motor and gearbox combinations are shown in FIG. 4. It should be noted that more than two electric motor and gearbox combinations can be used. For example, in this particular embodiment of the invention three electric motor and gearbox combinations are used (see FIG. 5 which shows three pinion gears). The lower shell 220 is sealed with respect to the upper shell 210 by seal 440. In one particular embodiment, the seal 440 is actually comprised of or includes two seals. The seals are sufficient to prevent or substantially prevent sea water from entering into the housing formed by the upper shell 210 and the lower shell when the yaw drive 200 and attached tidal turbine 100 are positioned in the sea.

Also shown more clearly in FIG. 4 is the slip ring 240. The slip ring 240 includes a slip ring tube 241 and a slip ring channel 242. The slip ring 240 allows power to be transmitted from the tidal generator 100 through the rotating upper shell 210. Power flows to the slip ring 240. A conductor 244 at the bottom of the slip ring 240 can then be used to transmit power away from the housing formed by the upper shell 210 and the lower shell 220. The upper shell 210 also includes a flange 250. The flange 250 has openings therein, such as openings 450, 451. The openings 450, 451 correspond to openings in a corresponding flange associated with the generator 100. The generator 100 therefore is mounted to the upper shell 210 of the yaw drive 200. To openings are shown in the figure. It should be understood that many more openings are shown (see FIG. 5) and are used to attach the generator 100 to the yaw drive 200.

Figure 5:
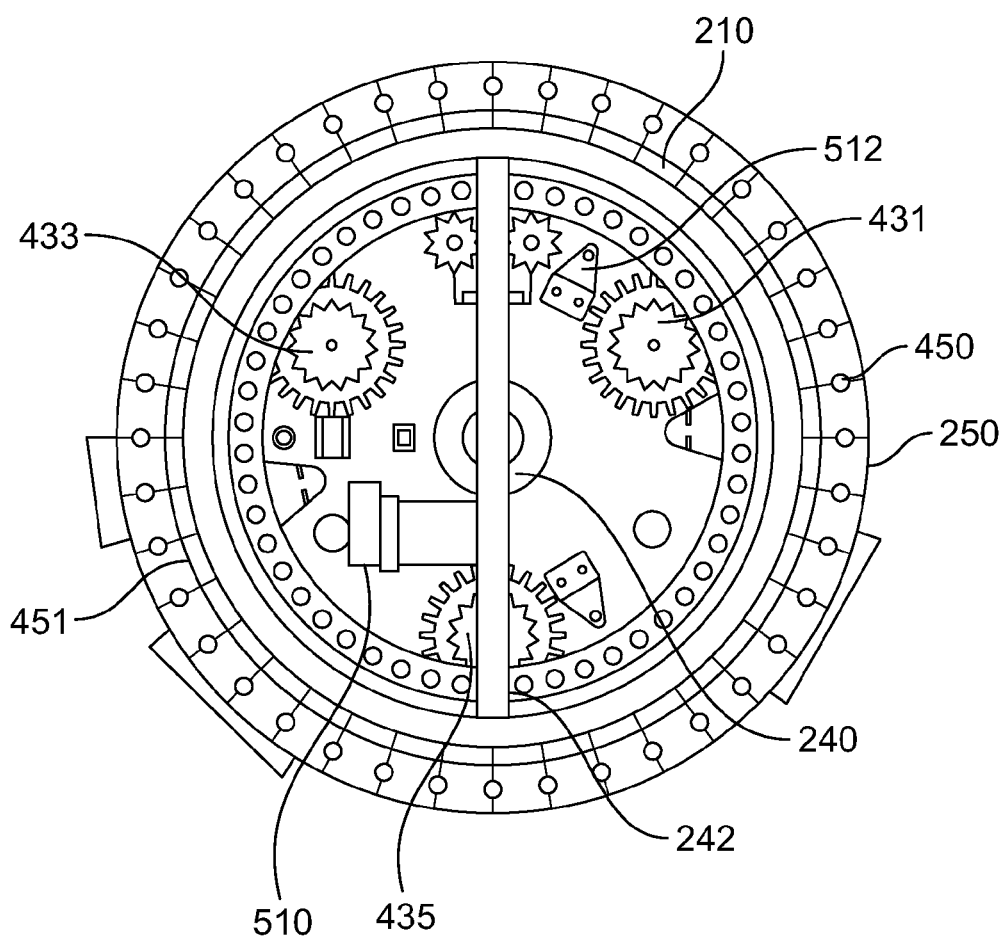
FIG. 5 is a top view of a yaw drive, according to an example embodiment.

FIG. 5 is a top view of a yaw drive 200, according to an example embodiment. As shown, three pinion gears 431, 433, 435 are shown. As mentioned above gearboxes and electric motors are attached to each of the pinion gears 431, 433, 435. The gearbox electric motor combinations are sufficiently large to rotate the upper shell 210 with respect to the lower shell 220. By including more than one gearbox electric motor combination in the configuration redundancy is built in to the yaw drive system 200. In other words, if two motor should fail, the remaining gearbox and electric motor combination is still capable of driving the pinion gear associated there with to rotate the upper shell 210 with respect to the lower shell 220. When all of the motor gearbox combinations are operational, the wear on each is less therefore prolonging the life of each motor gearbox combination. Also shown in this view is a grease pump 510. The grease pump 510 pumps grease the various parts of the upper shell 210 and the lower shell 220 to keep the various parts lubricated. Grease is pumped of various greasers, such as greater 512. Also shown is the slip ring channel 242 which is part of the slip ring used to transmit power through the rotating upper shell 210.

Figure 6:
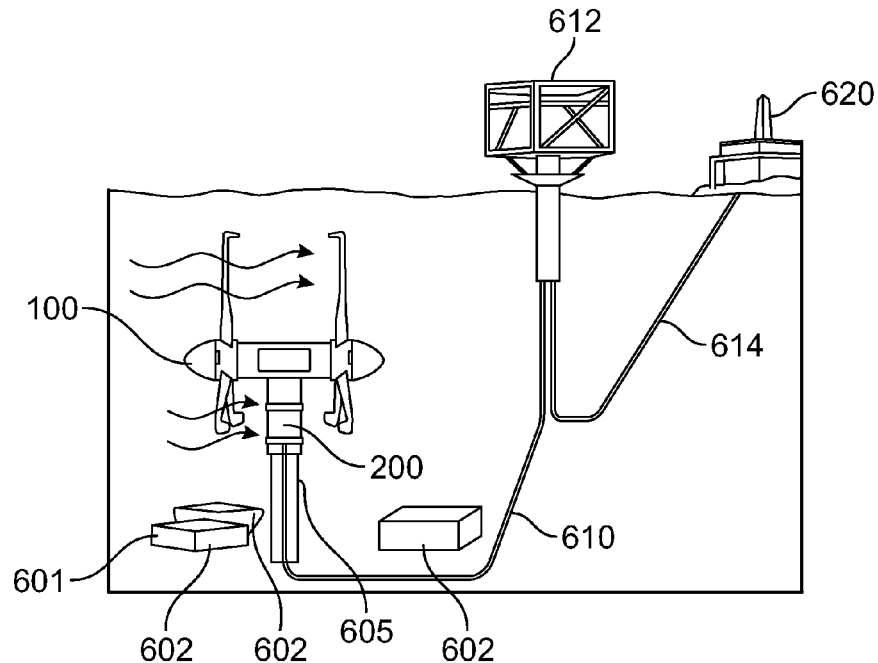
FIG. 6 is a schematic view of a tidal turbine transmitting power to an onshore power station, according to an example embodiment.

FIG. 6 is a schematic view of a tidal turbine 100 transmitting power to an onshore power station 620, according to an example embodiment. The tidal turbine 100 is placed on the ocean floor 601. Heavy foundations 602 keep the structure in place. The structure includes a stanchion 6052 which the yaw drive 200 and the generator 100 are attached. The transmission line 610 is connected to the generator or more specifically to the slip ring assembly 240 of the yaw drive 200. Power generated by the generator 100 is then transmitted via the transmission line 610 two and offshore transformer 612. The transformer 612 converts electrical energy or power to a high-voltage to allow the power to travel further with less line loss over transmission lines 614 two the on land power station 620. Of course, there may be more than one generator positioned on the seafloor in a particular area. As a result there may be more than a single transmission line entering the transformer 612. Multiple lines could be routed to the transformer and a larger transmission line 614 could be used to transmit the electrical power from the transformer to the power station 620.

Figure 7:
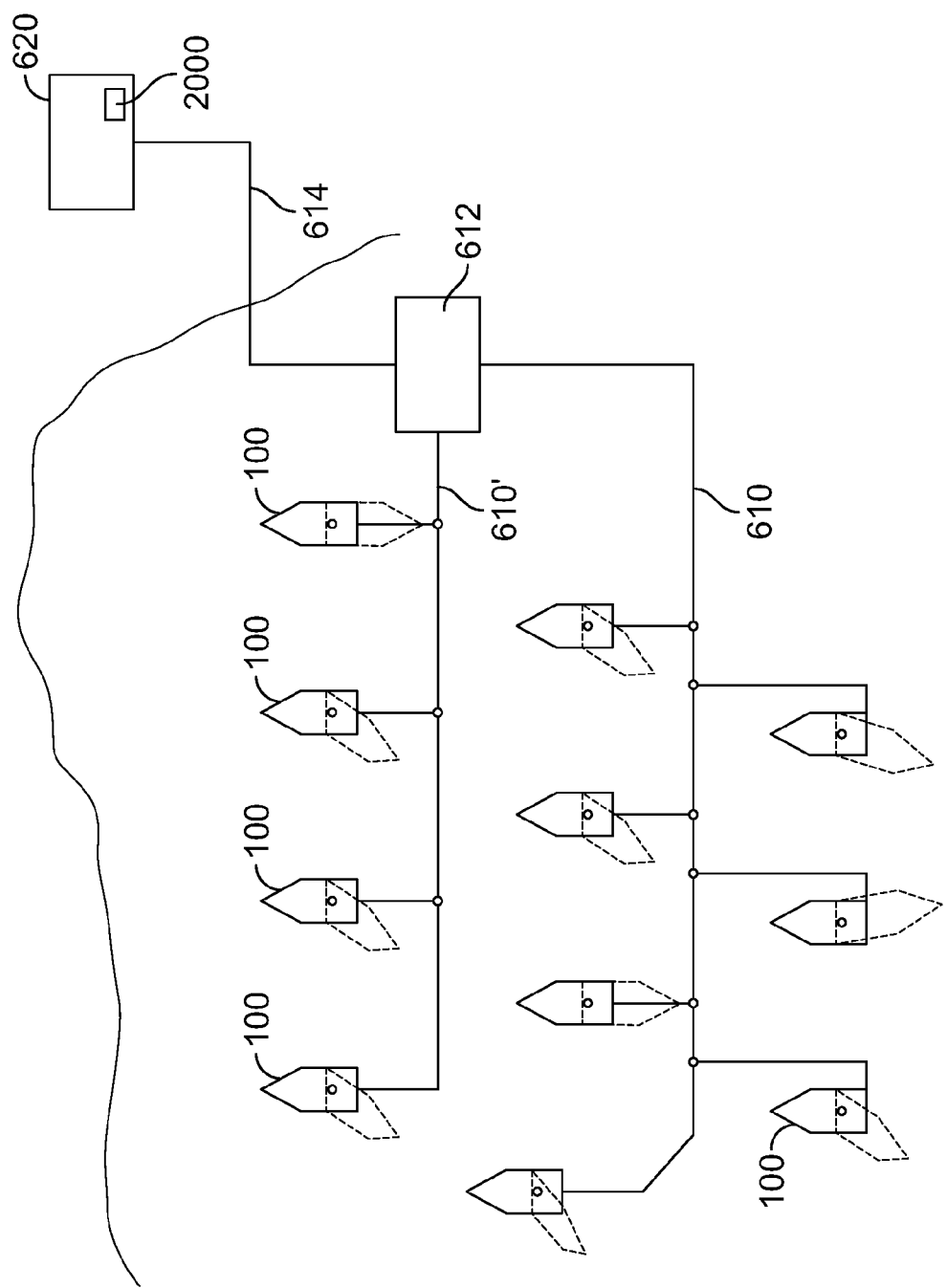
FIG. 7 is a schematic view of a plurality of tidal turbines in an area having active, high velocity tidal flows, according to an example embodiment.

FIG. 7 is a schematic view of a plurality of tidal turbines 100 in an area having active, high velocity tidal flows, according to an example embodiment. As shown in FIG. 7, there a plurality of turbines or tidal turbines 100 positioned in a high tidal flow area. Each tidal generator is shown as a house like structure in this schematic view. The tidal generators are shown in an ebb position by the solid house like structures. The tidal generators 100 are shown in a flow position by the dashed house like structures. It should be noted that the difference in position of a particular tidal generator 100 is not necessarily 180° opposed between the ebb position and the flow position. In other words, the ebb is not necessarily antiparallel with respect to the flow at any position within a high float tide area. It should also be noted that when comparing one tidal generator to another tidal generator the ebb positions are also not parallel. The same goes for the flow positions of the tidal generators 100. In other words, the ebb may not be anti-parallel with respect to the flow and the ebb and flow can vary in the area where the tidal generators are placed. Therefore, is generally necessary to do some sort of a survey to determine the direction of the ebb across the area where the tidal generators will be placed. It is also necessary as part of the survey to determine the direction of the flows across the area where the tidal generators 100 are placed. The yaw drives 200 associated with the tidal generators 100 are used to turn our rotate the tidal generators 100 into a position directly into the ebb or directly into the flow. When the tidal generators are positioned directly into the ebb or directly into the flow, the amount of electricity generated will be substantially maximized in the area where the generators are positioned. Once a survey is completed, a table of the various directions for each of the tidal generators 100 can be stored in memory or otherwise stored. Also stored, is the time of the tides and more specifically the slack times between the tidal ebb and the tidal flow. To again attempt to substantially maximized the amount of power obtained from a field of tidal generators 100, the tidal generators are turned from one of the ebb position to the flow position or from the flow position to the ebb position during the slack times between these flows. By turning the tidal generators 100 many of the shortcomings of the prior art can be avoided.

Figure 8:
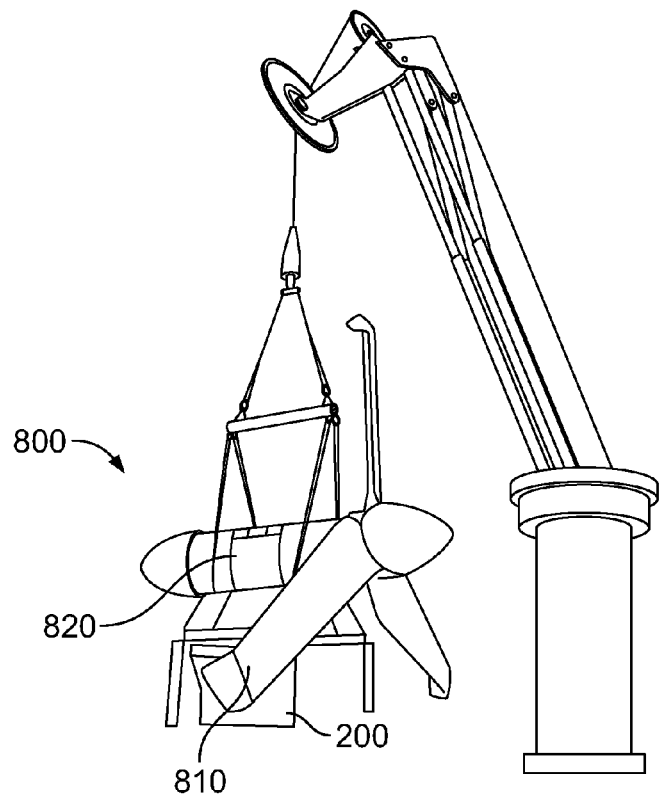
FIG. 8 is another tidal turbine 800 and an attached yaw drive, according to another example embodiment.

FIG. 8 is another tidal turbine 800 and an attached yaw drive 200, according to another example embodiment. The tidal turbine 800 includes a single set of blades and a generator 820. The tidal turbine 800 is rotated by the yaw drive 200 in substantially the same way as discussed above with respect to the tidal turbine 100. The tidal turbine 800 can be less expensive than the tidal turbine 100. By using the yaw drive 200 to rotate the tidal turbine 800 into the ebb or flow of the tides, the efficiency of extracting energy from the tides can be substantially maximized using the tidal turbine 800. It should be noted that a field of tidal turbines can be turned or rotated between a first position and a second position into one of either the ebb or the flow of the tides by use of a computer or by providing signals to each of the tidal turbines individually. It should also be noted that various types of tidal turbines 100,800 can be used or attached to a yaw drive 200 and gain the efficiencies discussed above. Basically, the yaw drive 200 assures that the tidal turbine is turned directly either into the ebb or the flow. When pointing directly into the ebb or the flow, the tide is able to impart as much energy as possible onto the plates of the tidal turbine. When the tidal turbine is not pointed directly into the ebb or the flow, a portion of the energy is lost.

Figure 9:
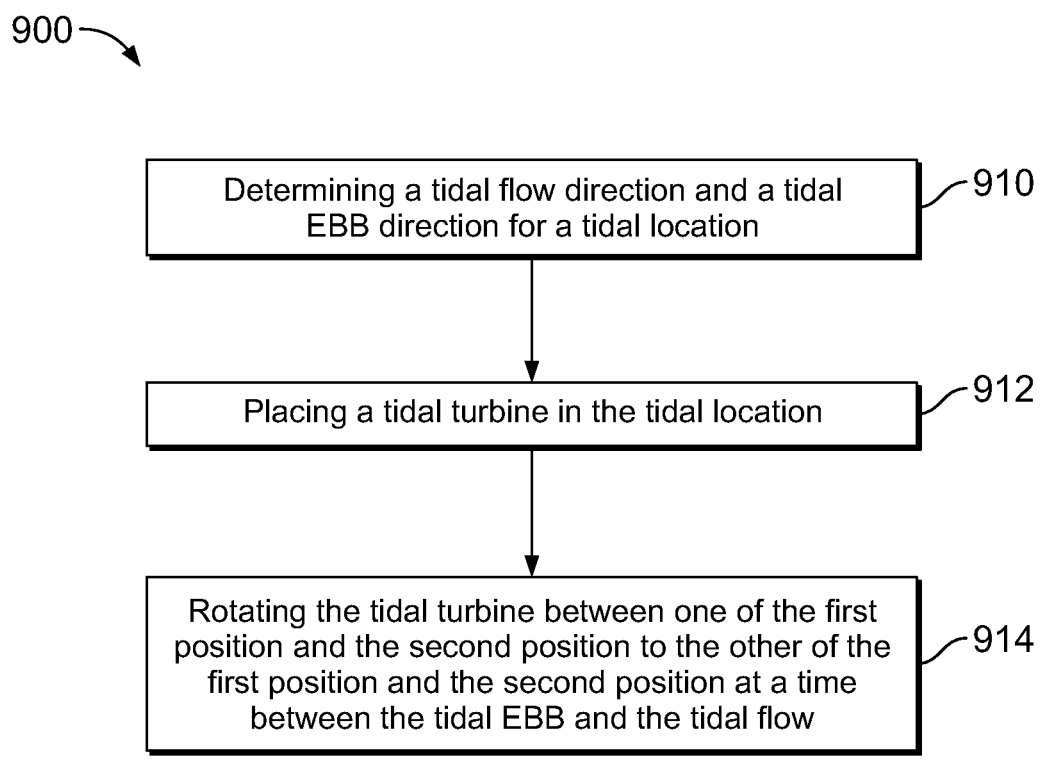
FIG. 9 is flow diagram of a method of extracting energy from a tidal turbine, according to another example embodiment.

FIG. 9 is flow diagram of a method of extracting energy from a tidal turbine, according to another example embodiment. The method 900 for harvesting tidal energy includes determining a tidal flow direction and a tidal ebb direction for a tidal location 910, placing a tidal turbine in the tidal location 912, and rotating the tidal turbine between one of the first position and the second position to the other of the first position and the second position at a time between the tidal ebb and the tidal flow 914. The first position is associated with the tidal flow direction and the second position is associated with a tidal ebb position. The first position and the second position are not anti-parallel. In other words, the first position is not 180 degrees opposed to the second position. The tidal flow and the tidal ebb are determined for a plurality of tidal locations, and a plurality of tidal turbines are placed at selected locations. The plurality of tidal turbines are rotated between one of the first position and the second position to the other of the first position and the second position at a time between the tidal ebb and the tidal flow. All or at least a portion of this method can be conducted by a computer system or computer.

Figure 10:
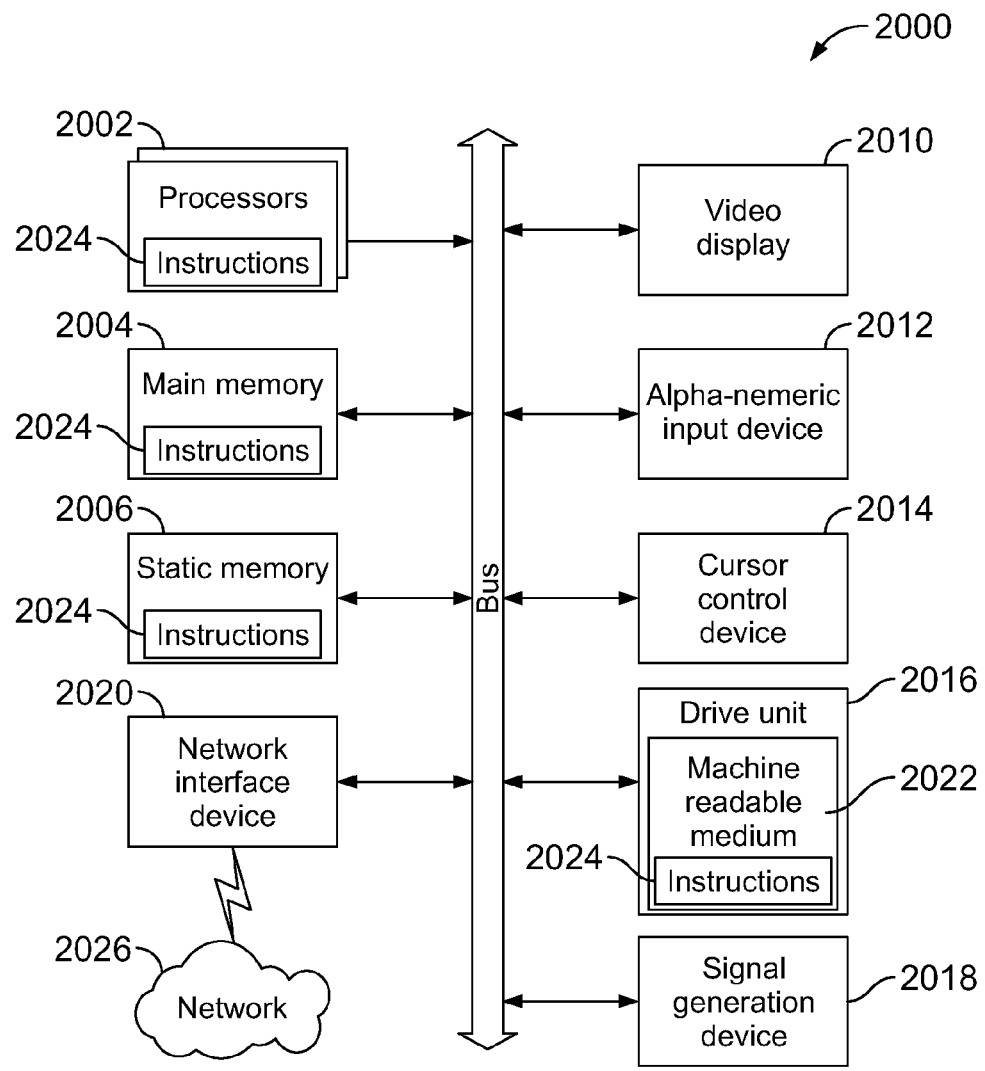
FIG. 10 is a schematic view of a computer, such as a computer used to control the tidal energy extraction process, according to an example embodiment.

FIG. 10 is a schematic view of a computer 2000, such as a computer used to control the tidal energy extraction process, according to an example embodiment. FIG. 10 shows a diagrammatic representation of a computing device for a machine in the example electronic form of a computer system 2000, within which a set of instructions for causing the machine to perform any one or more of the methodologies discussed herein can be executed or is adapted to include the apparatus for detection of biomarkers as described herein. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor or multiple processors 2002 (e.g., a central processing unit (CPU), a graphics processing unit (GPU), arithmetic logic unit or all), and a main memory 2004 and a static memory 2006, which communicate with each other via a bus 2008. The computer system 2000 can further include a video display unit 2010 (e.g., a liquid crystal displays (LCD) or a cathode ray tube (CRT)). The computer system 2000 also includes an alphanumeric input device 2012 (e.g., a keyboard), a cursor control device 2014 (e.g., a mouse), a disk drive unit 2016, a signal generation device 2018 (e.g., a speaker) and a network interface device 2020.

The disk drive unit 2016 includes a computer-readable medium 2022 on which is stored one or more sets of instructions and data structures (e.g., instructions 2024) embodying or utilized by any one or more of the methodologies or functions described herein. The instructions 2024 can also reside, completely or at least partially, within the main memory 2004 and/or within the processors 2002 during execution thereof by the computer system 2000. The main memory 2004 and the processors 2002 also constitute machine-readable media.

The instructions 2024 can further be transmitted or received over a network 2026 via the network interface device 2020 utilizing any one of a number of well-known transfer protocols (e.g., Hyper Text Transfer Protocol (HTTP/HTTPS), File Transfer Protocol (FTP/FTPS), CAN, Serial, or Modbus).

While the computer-readable medium 2022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine, that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

Returning once more to FIG. 9, conducting a survey of the title absent flows can be conducted by placing sensors on the ocean floor and monitoring the sensors with a computer 2000. Data regarding the direction of the ebb and the direction of the flow can be gathered and stored in the memory of the computer 2000. The data can be analyzed and combined with data for the times of the ebb, flow and slack times between that and flow to provide the times for switching or rotating the title generators between the ebb position and the flow position. The computerized method 900 can be further implement to turn or enable the rotation of one or more tidal generators 100, 800 to specific directions for the ebb and for the flow for each of the generators 100, 800. The computer can also be used to produce control signals at the slack time between the ebb tide and the flow tide. When the computerized method 900, discussed above, is programmed into a memory of a general purpose computer, the computer and instructions form a special purpose machine. The special purpose machine can be part of the tidal turbine system. The instructions, when programmed into a memory of a general purpose computer, is in the form of a non-transitory set of instructions. Additional instructions discussed above also transform the computer into a specialized machine associated with the tidal turbine 100, 800. The additional instructions are also non transitory.

A tidal turbine system includes a turbine 100, 800 adapted for use in an area having tidal ebbs and flows, and a yaw drive 200 for rotating the turbine 100, 800 between a first position associated with tidal flow and a second position associated with tidal ebbs. The yaw drive 200 is capable of moving the tidal turbine 100, 800 to a position where the tidal turbine 100, 800 is pointed substantially directly into the tidal flow in the first position and substantially into the tidal ebb in a second position. In this way, substantially the tidal turbine 100, 800 is most effectively used to generate power in the tidal ebb and tidal flow. The tidal turbine system, in some embodiments, includes a stanchion. The yaw drive 200 is either attached to the stanchion or to the turbine 100, 800. The yaw drive 200 is adapted to move or rotate the tidal turbine 100, 800. The stanchion also is attached to the sea floor. The stanchion 130 holds the yaw drive 200 and the tidal turbine 100, 800 above the sea floor. The yaw drive 200 includes a drive motor for rotating the yaw drive 200 and the turbine 100, 800 with respect to the stanchion. The drive motor includes a drive shaft that carries a pinion gear. The tidal turbine system also includes a ring gear 212. The ring gear 212 is attached to one of the turbine 100, 800 or the stanchion. The ring gear 212 is sized to engage the pinion of the drive motor. The drive shaft turns the pinion which, in turn, drives the ring gear 212. The tidal turbine system also includes a power line attached to the tidal turbine system. The yaw drive 200 includes a slip ring. The slip ring conducts generated electricity from the tidal generator to the power line to allow generated power to be transmitted to other locals, such as to a land based distribution network. In one embodiment, the yaw drive 200 further includes a plurality of drive motors for rotating the yaw drive 200 and the turbine 100, 800 with respect to the stanchion. The plurality of drive motors includes one or more redundant motors so that should one fail, the entire yaw drive 200 can continue to function. Having redundant drive motors also reduces wear on the drive motors and lengthens the time they will work. The tidal turbine system also includes a seal system for keeping the generator and the drive motor for rotating the yaw drive 200 substantially water tight. The drive motors can be operated remotely from a computer or other remote source. The yaw drive 200 can receive signals via hard wire or via a wireless coupling. The signals can enable the yaw drive 200 via wireless as well. The tidal turbine system can include a motor driver device communicatively coupled to the drive motor. The motor drive can be hardware, software or a combination of both. The motor driver drives the motor to move the generator from a first position directed into one of the ebb and flow associated with the tides, to a second position directed to the other of the ebb and flow associated with the tides during a slack time between the ebb and the flow. The motor drive can include a processor or part of a processor and memory associated therewith. The memory can store times associated with ebbs, flows and slack times. The motor driver can include instructions to cause the yaw drive to turn to a specified direction (into the ebb or into the flow) for example during a slack time. The memory coupled to the processor could include a table of slack times, and directions of the ebb and flow. The processor would direct the motor driver between the first position directed into one of the ebb and flow associated with the tides and the second position directed to the other of the ebb and flow associated with the tides. Of course, the processor could direct a plurality of yaw drives associated with a plurality of tidal turbines. Some of the turbines would have flow directions that differed from other turbines so the positions of the turbines would not be exactly the same.

A yaw drive is adapted for use with a turbine 100, 800. The yaw drive 200 includes a housing, a drive motor attached to the housing, and a ring gear 212. The drive motor includes a drive shaft having a pinion gear thereon. The ring gear 212 is configured to engage the pinion of the drive motor and rotate a turbine 100, 800 in response to rotating the drive shaft of the drive motor. The yaw drive 200 further includes a slip ring to allow electrical energy to be transmitted.

An ocean energy extraction system includes a plurality of turbine 100, 800 adapted for use in an area having tidal ebbs and flows, and a turbine 100, 800 moving system for rotating at least some of the plurality of turbines 100, 800 between a first position associated with tidal flow and a second position associated with tidal ebbs. The turbine 100, 800 moving system includes at least some of the plurality of turbines having a yaw drive 200 for rotating a turbine between the first position and the second position. The turbine 100, 800 moving system includes at least some of the plurality of turbines having a yaw drive 200 for rotating a turbine between the first position and the second position. In some embodiments, the turbine 100, 800 moving system of the ocean energy extraction system includes a computer 2000 in communication with at least some of the plurality of turbines. Under control of the computer 2000, the rotation of the turbine 100, 800 is timed the so that at least some of the plurality of turbines rotate between the first position and the second position. The same can apply to a plurality of turbines in a field of turbines. The ocean energy extraction system also includes an energy collection system. The energy produced by at least a plurality of turbines is transmitted from at least a plurality of turbines to the energy collection system. The ocean energy extraction system includes at least some of the plurality of turbines having a yaw drive 200 for rotating a turbine between the first position and the second position.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A tidal turbine system comprising: a turbine adapted for use in an area having tidal ebbs and flows; and a yaw drive for rotating the turbine between a first position associated with tidal flow and a second position associated with tidal ebbs, wherein the yaw drive further comprises a drive motor for rotating the yaw drive and the turbine with respect to the stanchion.

2. The tidal turbine system of claim 1 wherein the yaw drive further comprises:
 a drive motor for rotating the yaw drive and the turbine with respect to the stanchion, the drive motor including a drive shaft having a pinion gear thereon; and
 a ring gear 212 attached to one of the turbine or the stanchion, the ring gear 212 sized to engage the pinion of the drive motor.

3. The tidal turbine system of claim 1 further comprising a power line attached to the tidal turbine system, wherein the yaw drive further comprises a slip ring for conducting generated electricity from the tidal generator to the power line.

4. The tidal turbine system of claim 1 wherein the yaw drive further comprises a plurality of drive motors for rotating the yaw drive and the turbine with respect to the stanchion.

5. The tidal turbine system of claim 1 further comprising a seal system for keeping the generator and the drive motor for rotating the yaw drive substantially water tight.

6. The tidal turbine system of claim 1 further comprising a motor driver device communicatively coupled to the drive motor, the motor driver driving the motor to move the generator from a first position directed into one of the ebb and flow associated with the tides, to a second position directed to the other of the ebb and flow associated with the tides during a slack time between the ebb and the flow.

7. The tidal turbine system of claim 6 further comprising a processor for controlling the motor driver communicatively coupled to the drive motor, and a memory communicatively coupled to the processor, the memory including a table of slack times, and directions of the ebb and flow, the processor directing the motor driver between the first position directed into one of the ebb and flow associated with the tides and the second position directed to the other of the ebb and flow associated with the tides.

8. An ocean energy extraction system comprising: a plurality of turbine adapted for use in an area having tidal ebbs and flows; and a turbine moving system for rotating at least some of the plurality of turbines between a first position associated with tidal flow and a second position associated with tidal ebbs away from land, the system includes at least some of the plurality of turbines having a yaw drive tor rotating said turbine between the first position and the second position, wherein the yaw drive further comprises a drive motor for rotating the yaw drive and the turbine with respect to the stanchion.

9. The ocean energy extraction system of claim 8 wherein the turbine moving system includes at least some of the plurality of turbines having a yaw drive for rotating a turbine between the first position and the second position.

10. The ocean energy extraction system of claim 8 wherein the turbine moving system includes a computer in communication with at least some of the plurality of turbines which are under control of the computer to time the rotation of at least some of the plurality of turbines between the first position and the second position.

11. The ocean energy extraction system of claim 10 wherein the turbine moving system includes at least some of the plurality of turbines having a yaw drive for rotating a turbine between the first position and the second position.

12. The ocean energy extraction system of claim 8 further including an energy collection system, the energy produced by at least a plurality of turbines being transmitted from at least a plurality of turbines to the energy collection system.

13. The ocean energy extraction system of claim 12 wherein the turbine moving system includes at least some of the plurality of turbines having a yaw drive for rotating a turbine between the first position and the second position.

14. The ocean energy extraction system of claim 8 wherein the turbine moving system includes at least some of the plurality of turbines have a plurality of yaw drives for rotating a turbine between the first position and the second position.

* * * * *